United States Patent [19]

Tentler et al.

[11] Patent Number: 5,024,105
[45] Date of Patent: Jun. 18, 1991

[54] VISCOSITY-INSENSITIVE VARIABLE-AREA FLOWMETER

[76] Inventors: Michael L. Tentler, 11420 Luz Rd., San Diego, Calif. 92127; Gerald L. Wheeler, 10390-D E. Briar Oaks, Stanton, Calif. 90680

[21] Appl. No.: 329,433

[22] Filed: Mar. 28, 1989

[51] Int. Cl.$^5$ ............................................. G01F 1/26
[52] U.S. Cl. .............................. 73/861.58; 73/861.54
[58] Field of Search ............ 73/861.53, 861.54, 861.58

[56] References Cited

U.S. PATENT DOCUMENTS

| | | | |
|---|---|---|---|
| 2,052,022 | 8/1936 | Fisher | 73/861.54 |
| 2,220,496 | 11/1940 | Ringelstetter | 73/861.58 |
| 2,372,166 | 3/1945 | McCarty | 73/861.54 |
| 4,194,394 | 3/1980 | Bartholomaus | 73/861.54 |
| 4,453,418 | 6/1984 | Rousseau et al. | 73/861.58 |
| 4,572,004 | 2/1986 | White | 73/861.58 |
| 4,619,146 | 10/1986 | Teodorescu | 73/861.54 |

*Primary Examiner*—Herbert Goldstein
*Attorney, Agent, or Firm*—William C. Fuess

[57] ABSTRACT

The differential-pressure-sensing and variable-area-occluding functions of a variable-area flowmeter, or rotameter, are performed by separate, but mechanically connected, means. A housing defines a channel for flowing fluid from an upstream to a downstream location. A differential pressure sensor moves in a direction substantially perpendicular to the flowing fluid in response to the differential fluid pressure between the upstream and downstream locations. Because its movement is perpendicular to the flowing fluid, the pressure sensor is substantially insensitive to fluid friction and changes in fluid viscosity. A flow obstructor connects to the sensor and moves therewith to variably obstruct the channel and the flow of fluid from the upstream to the downstream location. Fluid frictional forces on the movement of the flow obstructor vary with changes in fluid viscosity. However the ratio of the area of the flow obstructor to the area of the pressure sensor, which ratio substantially equals the ratio of the fluid frictional forces to the pressure force, is low, typically 1:100. Consequently the overall flowmeter is relatively insensitive to changes in fluid viscosity. It typically exhibits less than ±1% deviation in indicated flow rate for viscosity variations on the order of ×20. A viscosity-insensitive flow regulator functions equivalently.

4 Claims, 2 Drawing Sheets

VISCOSITY-INSENSITIVE VARIABLE-AREA FLOWMETER

BACKGROUND OF THE INVENTION

1. Field of the Invention

The present invention generally concerns flowmeters, and particularly differential pressure flowmeters. The present invention more particularly concerns (i) improvements to variable-area flowmeters, or rotameters, and (ii) flowmeters that are insensitive to changes in fluid viscosity.

2. Background of the Invention

Measuring the flow of liquids is a critical need in many commercial operations.

For instance, beverage dispensing systems mix two or more fluids together in prescribed relative proportions. Such systems may also supply fluids at a prescribed flow rate. When each fluid flows at its prescribed rate for a set period of time a predetermined volume of beverage is dispensed. In order to precisely control either or both proportion and/or dispensed volume, the actual rates of fluid flow must be controlled.

One particular type are of beverage dispensing system is a post-mix soft drink dispenser. The post-mix soft drink dispenser mixes together and dispenses carbonated water and flavored soft drink syrup in a prescribed mix ratio. The dispenser typically injects the water and syrup simultaneously into a mixing chamber. The two fluids are mixed together to form a mixed soft drink that is then dispensed from the chamber through a nozzle into a drinking cup. The two fluids are normally supplied for coextensive time durations, and the mix ratio between the two fluids is typically controlled by using manually-adjustable flow control, or "metering", pins.

A goal of soft drink beverage dispensing is to control the accuracy of the "brix", or the percentage syrup in the mixture, to be within 1% of the desired value. [The term "brix" is an industry term derived from "Brix scale", meaning a hydrometer scale for sugar solutions.]

One prior approach to realizing this goal has been to control the pressure, and thereby the flow rate, of the two liquid components. Although a typical post-mix dispensing system so controlled operates satisfactorily in some situations, it has proven difficult to compensate for variations in the pressure of the carbonated water. Some prior systems have overcome the difficulty of precisely controlling water pressure by including relatively complex and expensive structures for regulating the water pressure. Other systems have sought to maintain a fixed mix ratio by controllably adjusting a syrup valve in accordance with the water's pressure. It is believed, however, that even these systems are unduly sensitive to pressure variations. Also, many of these systems are unduly complex and to require substantial manual adjustments when changing from one type of syrup to another.

Accordingly, another prior approach to realizing a post-mix dispensing system has involved the real-time measurement of the flows of carbonated water and of soft drink syrup. A system for so controlling the dispensing of a soft drink beverage is described in U.S. Pat. No. 4,487,333 for a FLUID DISPENSING SYSTEM. The fluid flowmeter used in the FLUID DISPENSING SYSTEM of U.S. Pat. No. 4,487,333, described in detail in U.S. Pat. No. 4,440,030, is a paddle wheel flowmeter operating over an extended range of flow regimes spanning both turbulent and laminar flow regimes.

However, the flowmeter of U.S. Pat. No. 4,440,030, and many other flowmeters, have output signals that vary with the viscosity of the fluid for which flow is measured. In the case of soft drink syrups, viscosity variations between syrups, and in an individual syrup with changes in temperature, are very great. Syrups can commonly vary in viscosity from ×2 to ×20 over the range between 32° F. (0° C.) and 194° F. (90° C.). These large variations cause commensurate variations in the signal outputs of previous viscosity-sensitive flowmeters.

Previous attempts to solve the problem of viscosity sensitivity have used 1) a means for determining the viscosity of the fluid passing through each flowmeter, and 2) a means for adjusting the meter's output signal accordingly. The adjusted signal more accurately indicates the fluid's actual flow rate, and this adjusted signal is more suitably conditioned for use by a fluid flow adjusting means to achieve a prescribed mix ratio. In the FLUID DISPENSING SYSTEM of U.S. Pat. No. 4,487,333, the relationship between temperature and viscosity for a particular fluid (soft drink syrup) is contained in a removable personality module, and used by a microprocessor to control the dispensing operation. This manner of providing information to the FLUID DISPENSING SYSTEM facilitates a reliable conversion of the system for use with fluids having different temperature/viscosity characteristics. Use of the personality module also permits the soft drink dispensing apparatus to be used conveniently with a number of different fluids (e.g., soft drink syrups) having different mixing characteristics, without requiring manual adjustments to be made.

The personality module is a complex, and expensive, scheme for compensating for variations in measured flow with changes in fluid viscosity. The personality module could be obviated if the flowmeter were to be substantially insensitive to variations in fluid viscosity. While such flowmeters exist, they typically do not exhibit sufficient accuracy for use in beverage dispensing. For example flowmeters of the wedge, pitot tube, and elbow meter types exhibit low sensitivity to fluid viscosity variations, but exhibit accuracies on the order of ±3-5% of full scale and ±5-10% of full scale, respectively.

Flowmeters having (i) essentially no sensitivity to fluid viscosity variations and also (ii) high accuracy do exist. Accurate viscosity-insensitive flowmeters include, for example, the electromagnetic, ultrasonic (doppler), ultrasonic (time-of-travel), mass (coriolis), and mass (thermal) types. Unfortunately, all these flowmeter types are very expensive. Finally, Weir (V-notch) and Flume (Marshall) type flowmeters exhibit very low sensitivity to fluid viscosity variations, while of moderate cost, exhibit only medium accuracy.

Variation in viscosity is a physical characteristic of many fluids, including soft drink syrups, that is difficult, if not impossible, to eliminate. Accordingly, post-mix beverage dispensing would benefit from a low cost, high accuracy, flowmeter that was substantially insensitive to variations in fluid viscosity. The flowmeter in accordance with the present invention will be seen to satisfy this requirement.

Differential pressure flowmeters are particularly pertinent to the present invention. The measurement of differential pressure to infer a liquid's rate of flow is well known.

The basic operating principle of differential pressure flowmeters is based on the premise that the pressure drop across the meter is proportional to the square of the flow rate. The flow rate is obtained by measuring the pressure differential and extracting the square root.

Differential pressure flowmeters, like most flowmeters, have a primary and secondary element. The primary element causes a change in the kinetic energy of the flowing fluid, which creates the differential pressure in the pipe. The unit must be properly matched to the pipe size, flow conditions, and the liquid's properties. The measurement accuracy of the element must be good over a reasonable range. The secondary element measures the differential pressure and provides the signal or read-out that is converted to the actual flow value.

A particular variable-area flowmeter, also called a rotameter, is shown in FIG. 1. It is perhaps the least expensive and most reliable of all flowmeters. The variable-area flowmeter 1 has a float 2 that moves up and down in a tapered tube 3. The distance moved is proportional to the flow rate of liquid 4 and the annular area between the float 2 and the wall of tapered tube 3. The height of the float 2 in tapered tube 3 may be read against scale 5. Because flow rate can be read directly on a scale mounted next to the tube, no secondary flow-reading devices are necessary.

Variable-area flowmeters, or rotameters, exhibit significant sensitivity to variations in fluid viscosity. In a variable-area flowmeter, the force in one direction on the float, typically due to gravity, is at all times of use equal to the force in the other direction resultant from the differential pressure across the float (between its top and its bottom) due to fluid flow. Meanwhile, the float also serves to variably occlude the liquid flow channel within which it is resident. When the fluid flow rate is greater then the float will move (rise) in the channel until the area of flow is increased and the differential pressure force of flowing fluid against the float is lowered to again equal the (constant) gravitational force.

Of course, if the liquid is more viscous, meaning more frictional, then an equal flow of a more viscous liquid will exert an increased frictional force on the float, forcing it to move in its channel equivalently as if an increased flow were being experienced. Conversely, a reduction in liquid viscosity simulates a reduced flow rate.

Presently available variable-area flowmeters exhibit significant viscosity sensitivity because they do not eliminate, or compensate for, the above-described changing frictional forces due to variations in liquid viscosity.

SUMMARY OF THE INVENTION

It has now been discovered that the pressuresensing and variable channel-occluding functions of the float within a variable-area flowmeter can be performed by separate, but connected physical structures and can be positioned relative to the direction of fluid flow to provide a flowmeter that is substantially insensitive to fluid viscosity.

Thus, in one embodiment, a variable-area flowmeter of the present invention comprises a housing containing a differential pressure sensor, a first flow obstructor and a biasing means. The housing defines a channel for transporting a flowing fluid in a direction from an upstream location to a downstream location. The differential pressure sensor is flow connected, between the fluid flow channel's upstream and downstream locations, for moving in a manner substantially perpendicular to the direction of the fluid flow. Movement of the sensor is in response to any static differential pressure present between the upstream and downstream locations.

The first flow obstructor is connected to the pressure sensor for (i) moving with the sensor to variable occlude the channel between the upstream and downstream locations, and (ii) receiving frictional force from the flowing fluid in the direction of the first flow obstructor's movement.

The biasing means operates between the housing and both the connected pressure sensor and first flow obstructor, for biasing the first flow obstructor to a position occluding fluid flow within the channel so that the differential pressure sensed by the sensor remains at a constant, preselected level.

The movement of the differential pressure sensor is indicative of the rate of fluid flow thereby forming a flowmeter.

These and other aspects and attributes of the present invention will become increasingly clear upon reference to the following specification and accompanying drawings.

BRIEF DESCRIPTION OF THE DRAWINGS

FIG. 3b is a diagrammatic view of a plunger and sleeve that are complementarily interoperative to variably occlude a fluid flow aperture within that second embodiment of a variable-area flowmeter in accordance with the present invention previously shown in FIG. 3a.

DETAILED DESCRIPTION OF THE INVENTION

Figure 1:
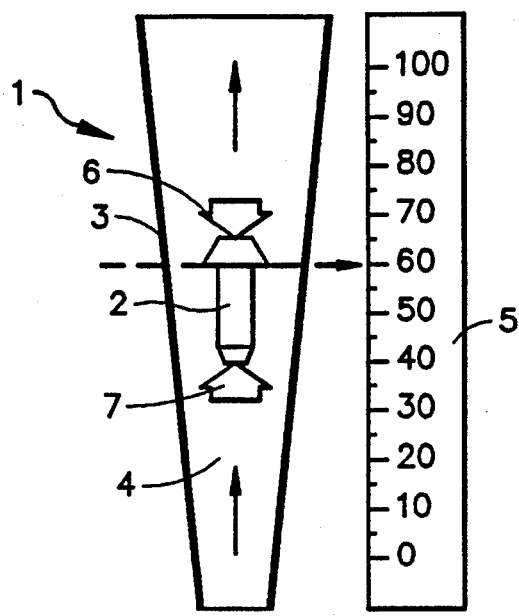
FIG. 1 is a diagrammatic view showing a previous variable-area flowmeter, or rotameter.

The present invention is based on the insight that the pressure-sensing and the variable-channel-area-occluding functions of the float within a variable-area flowmeter, or rotameter, are separate and severable, and are advantageously performed by separate, but connected, physical structures.

Pressure-sensing function within a flowmeter in accordance with the present invention is desirably performed by a pressure sensor that is substantially insensitive to changes in fluid viscosity. The variable-channel-area-occluding function is performed by a flow obstructor, connected to the pressure sensor for moving therewith, that is substantially sensitive to changes in fluid viscosity. In accordance with the present invention this viscosity-insensitive pressure sensor exhibits a large area relative to the area of the viscosity-sensitive flow obstructor. The flowmeter will exhibit an overall sensitivity to changes in fluid viscosity that is in proportion to the ratio of the area of the flow obstructor to the area of the pressure sensor. This ratio can be made very small, and flowmeter in accordance with the present invention can correspondingly be made to be substantially insensitive to changes in fluid viscosity.

In a preferred embodiment of a variable-area flowmeter in accordance with the present invention a housing defines a channel for fluid flowing from an upstream to a downstream location. A differential pressure sensor is flow connected between the upstream and the downstream locations for moving in a direction substantially perpendicular to the flowing fluid in response to the static pressure differential between these locations. Because the movement of the differential pressure sensor is perpendicular to the fluid flow, the laws of mechanics make the movement of the pressure sensor substantially insensitive to frictional forces of the flowing fluid. Because of its substantial insensitivity to fluid frictional forces, the pressure sensor is likewise substantially insensitive to changes in fluid frictional forces resulting from changes in fluid viscosity.

A first flow obstructor is connected to the pressure sensor for moving therewith in order to variably occlude the housing's channel, and the flow of fluid from the upstream to the downstream locations. The fluid flowing past the first flow obstructor imparts frictional forces to its movement. Those fluid frictional forces change with changes in fluid viscosity. Accordingly, the movement of the first flow obstructor is sensitive to changes in fluid viscosity—unlike the movement of the pressure sensor to which it is connected.

A biasing means, normally a spring, operates between the housing and the connected pressure sensor and first flow obstructor. The biasing means force biases the first flow obstructor to various positions occluding fluid flow within the channel so that the differential pressure sensed by the pressure sensor will continually remain, during various rates of fluid flow, at a constant, predetermined, level.

The movement of the connected differential pressure sensor and first flow obstructor is indicative of the rate of fluid flow, forming thereby a variable-area flowmeter.

In the variable-area flowmeter in accordance with the present invention the ratio of the pressure force exerted on the differential pressure sensor to the fluid frictional forces exerted on the first flow obstructor approximately equals the ratio of the area of the pressure sensor to the area of the first flow obstructor. The area of the first flow obstructor is normally made quite small, typically less than 1%, relative to the area of the pressure sensor. Accordingly the flowmeter will exhibit substantial overall insensitivity to changes in fluid friction due to changes in fluid viscosity.

Typically a flowmeter in accordance with the present invention will exhibit inaccuracies in flow measurement of less than $\pm 1\%$ responsive to changes on the order of times twenty ($\times 20$) in fluid viscosity.

Once the principle of the present invention to separate the (i) differential-pressure-sensing and (ii) flow-area-occluding functions of a variable-area flowmeter is recognized then it is readily possible to construct a large number of flowmeters that do not bear much physical resemblance to one another but that, in their fundamental operation, embody the same operational principle.

The differential pressure sensor may be, in different embodiments of the invention, either a diaphragm or a plunger that moves within a complementary cavity. The upstream and downstream fluid pressures are flow communicated to opposite sides of the diaphragm, or the plunger, as the case may be.

A force biasing means operative between the differential pressure sensor and the housing of the flowmeter is typically a spring. The force biasing may also be provided by the weight of a properly oriented moving element of a differential pressure sensor, such as the weight of a plunger that moves vertically within a cavity. The force biasing means, howsoever constituted, opposes the movement that the differential pressure sensor undergoes in response to changes in differential fluid pressure.

The flow obstructor connected to the differential pressure sensor for moving therewith in order to variably occlude the channel and to variably obstruct the flow of fluid between the upstream and downstream locations may likewise assume different forms. If the differential pressure sensor is a diaphragm then the flow obstructor is normally a simple rod attached to the diaphragm so as to move between greater and lesser proximity to an orifice within the channel in order to variably occlude the fluid flow. The operative region of the rod is preferably of complementary shape to the channel's orifice.

If the flow sensor is a plunger then the fluid obstructor is normally an apertured flange on the plunger body which moves along with the plunger body, similarly to a sliding valve, to variably occlude an orifice in the channel. The aperture of the plunger's flange is preferably triangular in shape in order that the cross-section of the obstructed opening is proportional to the square of such movement.

Each differential pressure sensor, and its attached flow obstructor, moves so that, for any one fluid flow rate, the combined force of flowing fluid on the fluid obstructor, and on the differential pressure sensor, will equal the force exerted by the force biasing means to the displacement of the differential pressure sensor, and of the flow obstructor connected thereto, that is resultant from this one flow rate.

The magnitude of fluid flow—which determines the displacement of the differential pressure sensor and the fluid flow obstructor attached thereto—may be indicated visually, or by a mechanical connection, or by, as is preferable, an electrical circuit. One preferred electrical circuit to detect the movement of the differential pressure sensor is a linear displacement transducer. The linear displacement transducer works by sensing the movement of a coil element in an electromagnetic field. The electro-magnetic field is preferably generated by an alternating current energization of an inductive coil.

The variable-area flowmeters in accordance with the present invention may be further adapted and configured as flow regulators. Such flow regulators typically exhibit low sensitivity to changes in fluid friction and fluid viscosity. In one preferred embodiment of a viscosity-insensitive flow regulator a second flow obstructor is connected to both the differential pressure sensor and to the original, first, flow obstructor for moving therewith. The second flow obstructor is thus force biased in its movement by the same spring that biases the differential pressure sensor and the original, first, flow obstructor. The second flow obstructor variably occludes the flow of fluid from that same downstream location that is flow connected to the differential pressure sensor to another, still further downstream, location.

The movement of the second flow obstructor is so that the fluid flow to the further downstream location is reduced if a fluid flow higher than a predetermined flow rate is indicated by movement of the differential pressure sensor, and is increased if a fluid flow lower than the predetermined flow rate is indicated by the opposite movement of the same differential pressure sensor. The strength of the force biasing spring is normally mechanically adjustable in order to set the predetermined flow rate. The predetermined flow rate will thereafter be substantially maintained regardless of changes in fluid pressure and/or viscosity.

A previous variable-area flowmeter, or rotameter, is shown in diagrammatic view in FIG. 1. In operation the force of gravity 6 bears down on float 2 while the flow pressure 7 of the fluid 4 presses up o the same float 2. When there is no flow of fluid 4, the float 2 rests freely at a rest location (numerical "0" on scale 5) at the bottom of tapered tube 3. As fluid 4 enters the bottom of the tube, the float 2 begins to rise. The position of the float 2 varies directly with the flow rate. Its exact rest position is at a point where the differential pressure between its upper and lower surfaces exactly balances the weight of the float 2.

The movement of float 2 in the variable-area flowmeter 1 serves two functions. The float 2 is responsive to a differential pressure caused by the flowing fluid 4 between its upper and lower surfaces. The movement of float 2 also opens up a relatively greater, or lesser, cross-sectional area of the tapered tube 3 to accommodate the flow of fluid 4 around the float 2. It should be noted that the exposed cross-sectional area between the tapered tube 3 and the float 2 is proportional to the square of the linear movement of the float.

Figure 2:
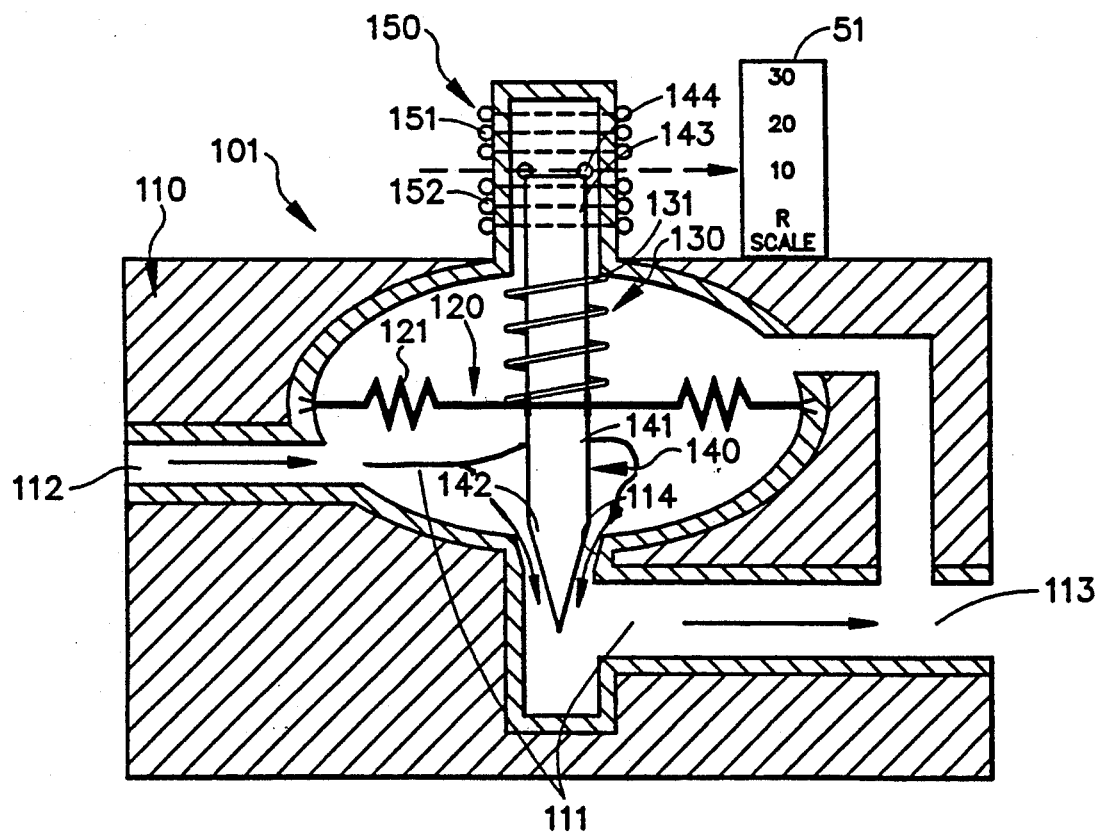
FIG. 2 is a cutaway view of a first embodiment of a variable-area flowmeter in accordance with the present invention.

Two preferred embodiments of a variable-area flowmeter in accordance with the present invention area shown in FIGS. 2 and 3. In both embodiments, the differential-pressure-sensing and the variable-occluding functions of the flowmeter are separated. The separation, and a high ratio of the area of the pressure sensor to the area of the flow obstructor, permits flowmeter operation with substantial insensitivity to changes in fluid friction and/or fluid viscosity. Although the two illustrated embodiments appear markedly physically dissimilar, they are both based on the same principle.

In the first embodiment of a variable-area flowmeter 101 shown in FIG. 2, a housing 110 defines a channel 111 between an upstream location 112 and a downstream location 113. The channel 111 presents an aperture 114 between its upstream location 112 and its downstream location 113. Aperture 114 need not be of any special size or configuration relative to other regions of channel 111. It simply represents a region where the channel will be variably occluded, as hereinafter explained. The aperture 114 can be, for example, configured in annular form similarly to the tapered seat of a valve.

A differential pressure sensor 120, constructed in the form of a flexible diaphragm 121, is positioned within housing 110. The diaphragm 121 is flow connected to the upstream location 112 of channel 111 on a one side and to the downstream location 113 of the same channel 111 on its opposite side. The diaphragm 121 is force biased in its position responsive to the differential pressure between upstream location 112 and downstream location 113 by force biasing means 130, typically a spring 131.

A flow obstructor 140, typically in the form of member or rod 141, is connected to the diaphragm 121 for moving therewith. The rod 141 moves from greater or lesser proximity to the aperture 114 within channel 111 in order to variably occlude the channel 111 and to variably obstruct the flow of fluid upstream location 112 to downstream location 113. The distal end region 142 of rod 141 is of complementary shape—normally circular—and configuration—normally presenting a conical taper—to the circular aperture 114 within the channel 111 of housing 110. The proximal end 143 to rod 141 may be made visible through housing 110, which is typically made of clear plastic in the region surrounding this proximal end region 143, as an indicator of flow. The position of proximal end region 143 may be visually referenced relative to scale 51, normally calibrated in units of choice, as an indication of the quantitative flow rate.

The rod 141 preferably mounts an electrically conductive feature 144, normally a copper coil, at its proximal end region 143. The movement of this electrically conductive feature 144 relative to coil 150 that is wrapped around the exterior of housing 110 near the proximal end region 143 of rod 141 permits the electrical sensing of the displacement of rod 141 and diaphragm 121. In particular, the coil 150 is normally energized in its upper half 151 and its oppositely wound lower half 152 with alternating current. The amount of inductive coupling between the two regions 151, 152 will be a function of the position of electrically conductive feature 144. This coupling may be sensed by commonly understood electrical circuits such as the well-known linear displacement transducer.

During operation of the first embodiment of the variable-area flowmeter 101, a neutral spatial position of diaphragm 121 is established by the spring 131 during the presence of a predetermined pressure difference between upstream location 112 and downstream location 113 within channel 111 of housing 110. This force biasing of spring 131 typically causes the rod 141 to be positioned so as to make the area of fluid flow at the position of aperture 114 to be greater than zero, but less than maximum. During operation of the flowmeter 101, the force of flowing fluid in channel 111 acting on diaphragm 121 and on rod 141 connected thereto equals the force exerted by the spring 131. The spring effectively produces a linear force in response to its compression or distension over the operative region of interest. Accordingly, the magnitude of the movement of the diaphragm 121 and of the rod 141 connected thereto will be indicative of the fluid flow rate in channel 111, and will typically be linearly indicative of such fluid flow rate.

In operation, the diaphragm 131 moves perpendicular to the flow of fluid in channel 111. Because the fluid frictional forces, and the changes in these fluid frictional forces due to changes in fluid viscosity, cannot couple to a perpendicular axis by the laws of mechanics, the diaphragm 121 exhibits a substantially insensitivity to changes in fluid friction and/or fluid viscosity. The diaphragm 121 is preferably located to one side of the fluid flow within channel 111 so that fluid flows substantially parallely, and not transversely, across one major surface of the diaphragm. Although the flow of fluid across the face of the diaphragm 121 may exhibit friction, this friction does not substantially contribute to the displacement undergone by diaphragm 121. The displacement of diaphragm 121 is almost purely a function of differential pressure in the flowing fluid.

Meanwhile, the rod 141 also exhibits friction with the fluid flowing within channel 111, especially at its distal end region 142. This friction is in a direction in which the rod 141, and the diaphragm 121 connected thereto, moves. Accordingly, to the extent of the fluid friction experienced by rod 141 both it, and the connected diaphragm 121, are sensitive to changes in fluid friction and/or fluid viscosity. However, the amount of friction experienced by rod 141 is relatively smaller—because of the relatively smaller area size of rod 141 relative to diaphragm 121—than was the case for the combined-function float 2 within the prior art flowmeter shown in FIG. 1.

In particular, the ratio of the pressure force exerted on diaphragm 121 to the fluid frictional force exerted on rod 141 is substantially equal to the ratio of the area of the diaphragm 121 relative to the area of the rod 141. In accordance with the present invention, both ratios are made high, typically on the order of 100:1. The flowmeter 300 will accordingly exhibit less than 1% inaccuracy due to gross changes in fluid friction resulting from changes in fluid viscosity.

The viscosity-insensitivity of the flowmeter 301 (and of the alternative embodiment flowmeter 201 shown in FIG. 3) may easily be measured quantitatively. A finely graduated measuring container, such as the "standard measuring cup" used in calibrating post mix soft drink dispensers is used. A liquid, such as a soft drink syrup, is controlled, normally by an electronic flow control circuit that adjusts a flow control value in accordance with the signal developed by coil 150 of flowmeter 301, to flow at a set rate. The volume accumulation of the liquid after a set period of several seconds is compared when the liquid is at 0° C. (immersed in ice) and when it is at 90° C. (nearly boiling). The viscosity of a typical soft drink syrup will vary by greater than a factor of twenty ($\times 20$) between these temperature extremes. For the identical indicated flow rate of flowmeter 301 the flow accumulations after identical periods of time will differ by less than 1%. Accordingly, the effect on the indication of flowmeter 301 due to viscosity variations on the order of $\times 20$ in the flowing fluid is less than 1%.

Moreover, and further considering the structure of flowmeter 301, the manner in which changes in fluid friction and/or viscosity operate on rod 141, and on variable-area flowmeter 101, actually serves to cancel the net effect of any such changes. Mainly, a fluid flow within the channel 111 that is of higher friction, and more viscous, will exert a greater frictional drag upon rod 141 and tend to force it downwards into aperture 114, thereby increasingly occluding the flow of fluid within channel 111. Meanwhile, the same higher friction and higher viscosity fluid flow will cause a higher differential pressure to be seen by diaphragm 121, forcing such diaphragm upwards. The same change in viscosity is thus to an extent self-cancelling in its effects. The flowmeter 101 in accordance with the present invention can actually be fine tuned by a choice of the material or surface treatment of rod 141, and of the area of diaphragm 121, so as to account for the second order effects of viscosity variation over an operational range of interest.

In summary, the variable-area flowmeter 101 exhibits, by virtue of is viscosity-insensitive differential pressure sensor 120 which is of a relatively larger area in combination with its friction- and viscosity-sensitive flow obstructor 140 which is of relatively smaller area, a substantial net low sensitivity to changes in fluid friction and/or fluid viscosity. As well as having this innate substantial insensitivity, the internal frictions that are experienced within the variable-area flowmeter 101 may actually be adjusted so as to be offsetting, or compensating, with changes in the friction or viscosity of the flowing fluid. The viscosity-insensitive variable-area flowmeter 101 exhibits, as an example of its application, an accuracy of better than 99% in the determination of flow rate for a soft drink syrup concentrate that varies in temperature from near 0° C. freezing (high viscosity) to nearly 90° C. (low viscosity). Although the quantative performance of flowmeter 101 to fluids of varying viscosity is dependent upon its exact construction configuration, and also on the particular materials used, it has been empirically demonstrated that variations in fluid friction and viscosity of the order of $\times 20$ cause less than 1% deviation in the flow rate that will be indicated by the flowmeter 101 for the same identical actual flow rates.

Figure 3A:
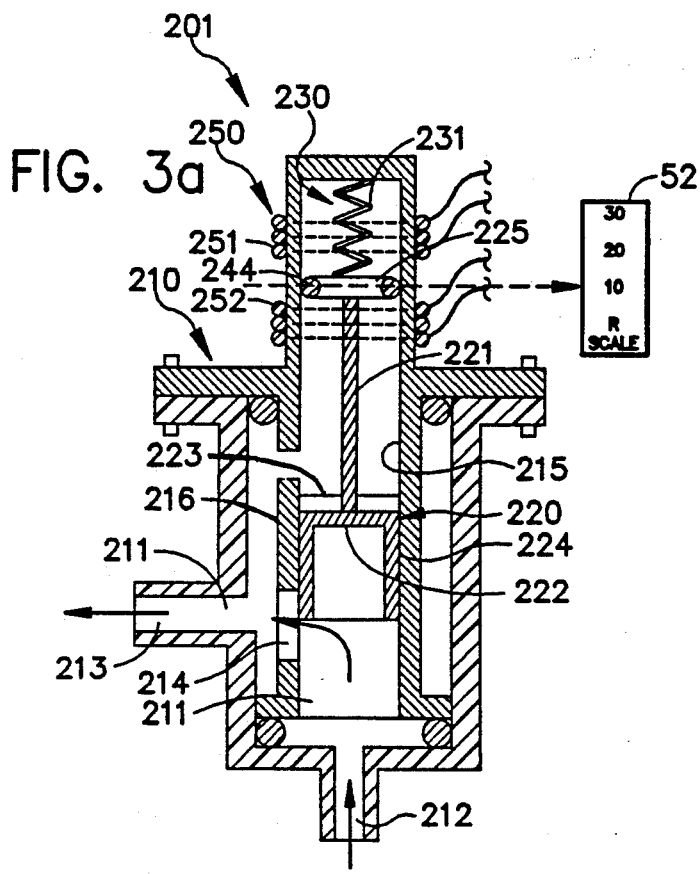
FIG. 3a is a cutaway view of a second embodiment of a variable-area flowmeter in accordance with the present invention.
Figure 3B:
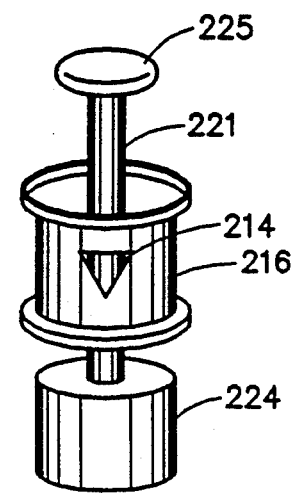

A second embodiment of a variable-area flowmeter in accordance with the present invention is shown in FIG. 3, consisting of FIG. 3a and FIG. 3b. The variable-area flowmeter 201 is considerably different in appearance from the variable-area flowmeter 101, but operates on equivalent principles. A housing 210 defines a channel 211 between an upstream location 212 and a downstream location 213. Between the upstream location 212 and the downstream location 213 there is an aperture 214 which may be variably occluded, in a manner to be explained, to obstruct the flow of fluid within the channel 211.

The differential pressure sensor 220 is embodied in a plunger 220 that is shown in perspective view in FIG. 3b. The plunger 220 moves in a cavity 215, normally a cylindrical bore, of housing 210. The distal end region 222 of the plunger 220 is exposed to the upstream fluid pressure of upstream location 212. The fluid pressure at downstream location 213 is ported via aperture 216 of housing 210 to the opposite, proximal end side 223, of plunger 220. The differential pressure seen between the distal end surface 222 and the proximal end surface 223 of plunger 220 causes it to move against the force of a force biasing means 230, typically a spring 231, within the cavity 215 of housing 210.

Although the force biasing means 230 in the second preferred embodiment of the variable-area flowmeter 201 is preferably a spring 231, it is possible to perform this force biasing by orienting the mass of plunger 220 in a substantially vertical cavity 215 of housing 210.

The flange 224 of plunger 220 is interoperative with the aperture 214 within sleeve portion 216 of housing 210 to variably occlude the flow of liquid within the channel 211. In FIG. 3b it is illustrated that the aperture 214 is within the sleeve portion 216 of the housing 210. The flange 224 of plunger 220 operates to variably occlude this aperture. Conversely, it will be understood that an aperture could have been positioned within the flange 224 to the plunger 220 which could be interoperative with a larger aperture within the sleeve region 216 of housing 210 to equivalently obstruct the fluid flow within channel 211.

In accordance with the present invention, the aperture 214 within housing 210, or its alternative equivalent within the flange 224 of plunger 220, is preferably triangular in shape. This particular shape provides that the change of the area of channel 211 at the location of aperture 14 will be proportional to the square of the movement of plunger 220. This triangular shape of the aperture thereby makes the response exhibited by the second embodiment of the variable-area flowmeter 201 shown in FIG. 3 with increasing flow rate equivalent to the response of the prior art flowmeter 1 shown in FIG. 1, and also to the response of the first embodiment variable-area flowmeter 110 shown in FIG. 2. The pressure differential is directly proportional to the square of the flow. The movement of the pressure sensor is directly proportional to the flow rate, giving a linear flowmeter.

It should be understood that aperture 214 could assume other shapes than that of an equilateral triangle. If, for example, the aperture was configured as a simple rectangle or square, then the change of flow cross-sectional area would be linear with movement. A triangle of nonequilateral shape, or other, complex, shapes for aperture 214 could be envisioned. Generally, it is possible to create an aperture 214 so that the movement equals any desired function of flow, movement m equals a function of flow, $m = f(flow)$. Likewise, the change of flow cross-sectional area can be made to be any desired function of the opening area OA, $OA = G\ f(flow)$. Finally, the pressure differential P is proportional to the square of the flow. Therefore $P = G\ (f(flow))^2$.

Generally, the second embodiment of the variable-area flowmeter 201 is constructed with a triangular aperture 214 so as to be linearly indicating. The linear movement of the flange 224 to plunger 220 causes an identical movement of proximal end extension 225 of plunger 220 by action of shaft 221. Such indication may be visual by viewing the location of the proximal end extension 225 to plunger 220, including viewing its location relative to scale 52. Such indication may be electrical by sensing the position of electrically conductive element 244, typically a simple copper loop, with external inductive coil 250. As in the first embodiment variable-area flowmeter 101 shown in FIG. 2, the energization of upper and lower segments 251, 252 of electrical coil 250 is normally with an alternating current. It forms a linear displacement transducer.

Still other means of sensing the position of the rod 141 shown in FIG. 2, and the plunger 221 shown in FIG. 3, will be obvious to a practitioner of the mechanical arts. The movement of such elements could cause, for example, the movement of a pointer against a dial scale by a suitable mechanical linkage.

Figure 4:
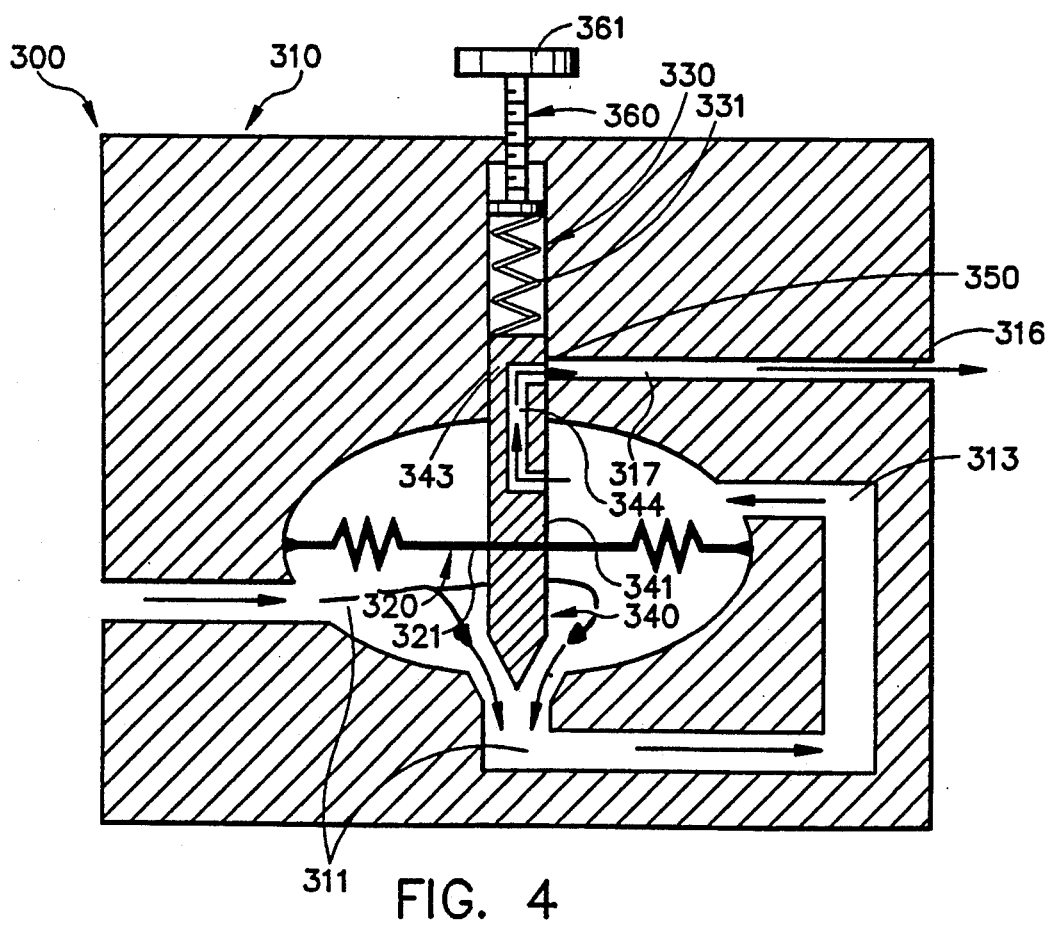
FIG. 4 is a cutaway view of a fluid flow regulator in accordance with the present invention.

An application of the principles of the present invention in a substantially viscosity-insensitive flow regulator is shown in FIG. 4. The flow regulator 300 includes a housing 310, a differential pressure sensor 320, a force biasing means 330, and a flow obstructor 140—each similar to the first embodiment variable-area flowmeter 110 shown in FIG. 2. The differential pressure sensor is preferably a diaphragm and the flow obstructor is preferably a member, or rod.

The downstream location 313 to the fluid flow along channel 311 is ported to the low pressure side of diaphragm 321. However, this downstream location 313 is further connected through additional, second, flow obstruction means 350 to another, further, downstream location 316. The additional, second, flow obstructor 350 may be based, among other configurations, on registration of a channel 144 within the proximal end region 343 of member, or rod, 341 with a channel 317 within the housing 310. When the member, or rod, 341 moves upwards, under force of an increased flow causing an increased differential pressure to be seen across diaphragm 321, then the flow obstruction produced by the second flow obstructor 350 is diminished, tending to reduce the flow to the original rate so as to restore the original differential pressure. Conversely, when a reduced differential pressure is seen across diaphragm 321 than the movement of channel 344 within member, or rod 341 relative to channel 317 within housing 310 will tend to cause an increased pressure across diaphragm 321, restoring the normal level of flow.

A set screw 360, typically turned by a knurled knob 361, may be used to adjust the strength of force biasing means 330 (spring 331), and thus the normal rate of flow.

It should be understood that the pressure differential seen across the differential pressure sensor 320 in the flow regulator 300 shown in FIG. 4 is not the same high pressure that is seen across the differential pressure sensor elements in the flowmeter embodiments of FIGS. 2 and 3. Rather, the differential pressure seen across the pressure sensor 320 is relatively low because flow from downstream location 313 is further obstructed by the second flow obstructor 350, and is not vented to the atmosphere (which is typically at further downstream location 316). This means that friction, and frictional forces, are of increased effect in the flow regulator 300 relative to the effect that these forces had in the flowmeters 101, 201.

The major sources of error in the mechanical flow controller 300 shown in FIG. 4 are as follows. First, the very act of combining a flow regulator and a regulator in one device induces error. Definitionally, the first flow obstructor 340 must move to reestablish equilibrium even though the opening should be maintained exactly the same for the same flow. This necessary movement should be compared to electronics wherein (i) a set flow level may be detected, and then (ii) an independently adjustable and controllable motor downstream may subsequently, resultantly from this detection, be used to set flow. In other words, an all-mechanical flow regulator is inherently inferior, although possibly less costly, than a flowmeter coupled with an electronic flow control circuit.

A second source of mechanical error in the flow regulator shown in FIG. 300 is resultant from the accuracy of parts. Particularly, any leakage between the member, or rod, 341 and the housing 310 distorts the accuracy of flow regulation. In order to reduce leakage the parts must be made to fit tightly. However, when parts fit tightly then their relative movement is particularly subject to frictional forces resultant from the fluids with which they are in contact.

Finally, a mechanical error is inherent in flow regulator 300 because it is attempting to variably occlude flow at the location of second flow obstructor 350 without inducing any force on the member, or rod, 340. However, this is impossible. The actual forces induced on member, or rod, 341 depend on the shape and on the angles of the opening of the second flow obstructor 350. The second flow obstructor 350 causes a feedback from the circuit of the regulator to the flowmeter, mainly to the member, or rod, 341 which causes a distorted, erroneous, reading at the flowmeter. Thus the action of the regular circuit induces error in the flowmeter upon which the operation of the regulator circuit depends.

Because of these three sources of mechanical error, the flow regulator 300 shown in FIG. 4, and alternative configurations such as those based on the second embodiment variable-area flowmeter 201 shown in FIG. 3, are not perfect devices. Nonetheless to certain inaccuracies that are inherent in such devices, the flow regulator 300, and counterpart regulators, in accordance with the present invention do exhibit much improved insensitivity to changes in fluid friction and/or fluid viscosity.

In accordance with the preceding discussion, certain other alterations and adaptations of the present invention will suggest themselves to practitioners in the arts of fluid flow and flow measurement. Once the fundamental principles of the present invention regarding the separation of the differential-pressure-sensing and the channel-occluding functions are recognized, many diverse variations in the construction of flowmeters and flow regulators constructed in accordance with these principles are possible. It will of course be recognized that in these constructions the larger flow pressure sensing element should normally be positioned so that its sensing operation is not sensitive to fluid friction and/or fluid viscosity. Meanwhile, the flow occluding element, which may unavoidable remain sensitive to fluid friction and/or fluid viscosity, should be minimized in area relative to the viscosity-insensitive pressure sensor.

In accordance with the preceding discussion, the present invention should be interpreted broadly in accordance with the language of the following claims, only, and not solely in accordance with those preferred embodiments within which the invention has been taught.

What is claimed is:

1. A variable area fluid flow regulator comprising:
a housing defining a chamber having a connection to an inlet port and two spaced-apart flow connections to an outlet port;
flexible diaphragm means, dividing the chamber at a position between the two spaced-apart outlet port connections so that one outlet port flow connection dead ends in the portion of the chamber on one side of the diaphragm while a channel for flowing fluid between the inlet port and the outlet port is defined in the remaining portion of the chamber on the other side of the diaphragm, for moving in response to differential pressure between the inlet port and the outlet port; and
a force biasing means, operatively connected between the flexible diaphragm means and the housing, for force biasing the movement of the flexible diaphragm means against the force of the differential pressure; and
a flow controller means, operatively connected to the flexible diaphragm means for moving therewith, for moving relative to the channel and relative to any fluid flowing therein in order to variably occlude the channel and to adjust the rate of fluid flow therein until the differential pressure across the flow controller means equals the force of the force biasing means;
the operative connection between the flexible diaphragm means and the flow controller being so that an increased fluid frictional drag force on the flow controller where it moves to variably occlude the channel acts mechanically oppositely to a change in a static differential pressure force on the flexible diaphragm means due to the same increased fluid frictional drag force, the mechanically oppositely-acting forces tending to cancel each other.

2. The fluid flowmeter according to claim 1 wherein the force biasing means is force biasing the diaphragm to be at zero flexure during the presence of a predetermined non-zero pressure difference between the inlet port and the outlet port.

3. The fluid flowmeter according to claim 1
wherein the operative area of the diaphragm means dividing the chamber and moving in response to the differential pressure is large relative the operative area of the flow controller means moving relative to the channel to control the rate of fluid flow;
wherein the moving of the relatively larger operative area of the diaphragm means is very substantially insensitive to fluid friction and to fluid viscosity;
wherein the moving of the relatively smaller operative area of the flow controller means is sensitive to fluid friction and to fluid viscosity;
wherein the fluid flowmeter is sensitive to fluid friction and to fluid viscosity at but a relatively smaller operative area thereof, and is accordingly substantially insensitive to fluid friction and to fluid viscosity overall.

4. The fluid according to claim 1 further comprising:
a linear displacement transducer for sensing the movement of the flexible diaphragm means.

* * * * *